(12) United States Patent
Wang

(10) Patent No.: US 8,156,955 B2
(45) Date of Patent: Apr. 17, 2012

(54) INFLATING NOZZLE ASSEMBLY

(76) Inventor: Wei-Chi Wang, Tainan (TW)

( * ) Notice: Subject to any disclaimer, the term of this patent is extended or adjusted under 35 U.S.C. 154(b) by 400 days.

(21) Appl. No.: 12/556,618

(22) Filed: Sep. 10, 2009

(65) Prior Publication Data

US 2010/0116353 A1    May 13, 2010

(51) Int. Cl.
*F16K 15/20* (2006.01)
(52) U.S. Cl. .................. 137/231; 137/223
(58) Field of Classification Search ........ 137/118.01–118.03, 223, 231, 137/232, 119.01; 285/312

See application file for complete search history.

(56) References Cited

U.S. PATENT DOCUMENTS

| | | | | |
|---|---|---|---|---|
| 5,762,095 A * | 6/1998 | Gapinski et al. | ........... | 137/223 |
| 5,819,781 A * | 10/1998 | Wu | ........... | 137/231 |
| 5,975,109 A * | 11/1999 | Wu | ........... | 137/231 |
| 5,983,920 A * | 11/1999 | Gapinski et al. | ........... | 137/231 |
| 6,146,116 A * | 11/2000 | Wu et al. | ........... | 137/223 |
| 6,220,273 B1 * | 4/2001 | Wu | ........... | 137/231 |
| 6,953,326 B2 * | 10/2005 | Wang | ........... | 417/234 |
| 7,562,671 B2 * | 7/2009 | Wang | ........... | 137/231 |
| 7,866,335 B2 * | 1/2011 | Wang | ........... | 137/231 |
| 2005/0230499 A1 * | 10/2005 | Wang | ........... | 239/390 |
| 2009/0229677 A1 * | 9/2009 | Wang | ........... | 137/231 |

* cited by examiner

*Primary Examiner* — John Rivell
*Assistant Examiner* — Craig J Price
(74) *Attorney, Agent, or Firm* — C. G. Mersereau; Nikolai & Mersereau, P.A.

(57) ABSTRACT

An inflating nozzle assembly has a housing, two nozzles and a pushing device. The housing has two nozzle chambers and two outlets. The nozzles are mounted respectively in the first nozzle chamber, and one of the nozzles has a nozzle body, a nozzle rod and a spring. The nozzle body has at least one inlet. The nozzle rod is movably mounted in the nozzle body and has a sealing protrusion to divide two communication segments in the nozzle body. The spring is connected to the nozzle rod to keep one of the communication segments of the axial hole from communicating with the at least one inlet in the first nozzle body. Accordingly, an airflow led through the outlets of the housing can be automatically switched by inserting different types of air valves into the corresponding outlets.

18 Claims, 5 Drawing Sheets

INFLATING NOZZLE ASSEMBLY

BACKGROUND OF THE INVENTION

1. Field of the Invention

The present invention relates to an inflating nozzle assembly, and more particularly to an inflating nozzle assembly having two nozzles to fit with different types of air valves.

2. Description of Related Art

A conventional nozzle can only be applied to a specific air valve for inflating an object, such as a ball, a tire or the like, so different types of nozzles must be prepared and carried for different uses, which is inconvenient in use.

With reference to FIG. 5, a conventional nozzle assembly that can fit with different types of air valves comprises a housing (80), two nozzles (81,82) and a switching lever (84). The housing (80) has an inlet (802) and two outlets (804,806). The nozzles (81,82) are mounted moveably in the housing (80), have different structures from each other and communicate selectively with the inlet (802) and respectively with the outlets (804,806). The switching lever (84) is mounted pivotally in the housing (80) and has two ends respectively corresponding to and abutting with the nozzles (81,82). When an air valve is inserted into one of the outlets (804,806), a corresponding nozzle (81,82) is moved to communicate with the inlet (802) and push the switching lever (84) to pivot. The pivoted switching lever (84) will push another nozzle (81,82) to close the corresponding outlet (804,806), such that pressurized air can be led into and inflate an object via the inlet (802), the nozzle (81,82), the corresponding outlet (804,806) and the air valve.

However, the conventional nozzle assembly has a complicated structure and the following drawbacks.

1) The switching lever (84) is a necessary element for the conventional nozzle assembly to selectively push one of the nozzles (81,82) to close the corresponding outlet (804,806), so the structure of the conventional nozzle assembly is complicated and has a high manufacturing cost.

2) The switching lever (84) is pushed by one nozzle (81,82) that is connected to an air valve and pushes the other to close the corresponding outlet (804,806). If the switching lever (84) is not precise in size or a provided pushing force from the nozzle (81,82) connected to the air valve is not sufficient, the switching lever (84) cannot provide enough force to push the other nozzle (81,82) to completely close the corresponding outlet (804,806) so leakage will occur. Additionally, to keep the switching lever (84) and nozzles (81,82) from being worn off during the movement thereof, the switching lever (84) and the nozzles (81,82) have to be made of wear-resistant material such that the manufacturing costs of the conventional nozzle assembly are high.

To overcome the shortcomings, the present invention tends to provide an inflating nozzle assembly to mitigate or obviate the aforementioned problems.

SUMMARY OF THE INVENTION

The main objective of the invention is to provide an inflating nozzle assembly that is versatile and convenient in use and has a simplified structure and an excellent leakage-proofing effect. The inflating nozzle assembly comprises a housing, two nozzles and a pushing device. The housing is hollow and has an outlet end, a pushing end, two nozzle chambers, an inlet and two outlets. The pushing end is opposite to the outlet end. The nozzle chambers include a first nozzle chamber and a second nozzle chamber formed in the housing and communicating with each other. The inlet is defined in the housing and communicates with the first nozzle chamber. The outlets include a first outlet and a second outlet formed in the outlet end of the housing and communicating respectively with the first and second nozzle chambers. The first nozzle is mounted in the first nozzle chamber and comprises a first resilient holder, a first nozzle body, a nozzle rod and a spring. The first resilient holder is mounted in the first nozzle chamber and has a first passage communicating with the first outlet. The first nozzle body is connected to the first resilient holder, is mounted in the first nozzle chamber and has an axial hole and at least one inlet. The axial hole is defined axially through the first nozzle body and has an inner surface. The at least one inlet is defined radially in the first nozzle body and communicates with the inlet in the housing and the axial hole in the first nozzle body. The nozzle rod is movably mounted in the axial hole in the first nozzle body and has a sealing protrusion. The sealing protrusion is formed around the nozzle rod and abuts with the inner surface of the axial hole to divide the axial hole into two communication segments. The spring is connected to the nozzle rod to keep one of the communication segments of the axial hole from communicating with the at least one inlet in the first nozzle body. The second nozzle is mounted in the second nozzle chamber and has a second resilient holder and a second nozzle body. The second resilient holder is mounted in the second nozzle chamber and has a second passage communicating with the second outlet. The second nozzle body is connected to the second resilient holder, is mounted slidably in the second nozzle chamber and has an end, a through hole and a connecting rod. The end is connected to the second resilient holder. The through hole is defined axially through the second nozzle body. The connecting rod is mounted on and protrudes from the end of the second nozzle body, extends into the second passage of the second resilient holder and has at least one air channel defined in the connecting rod and communicating with the through hole in the second nozzle body. The pushing device is mounted on the pushing end of the housing and comprises a pushing base and a pushing lever. The pushing base is mounted slidably in the pushing end of the housing and abuts with the first and second nozzles. The pushing lever is mounted pivotally on the pushing end of the housing and has an end selectively abutting against the pushing base when the pushing lever is pivoted to push the pushing base to move relative to the housing.

Other objects, advantages and novel features of the invention will become more apparent from the following detailed description when taken in conjunction with the accompanying drawings.

DETAILED DESCRIPTION OF PREFERRED EMBODIMENT

Figure 1:
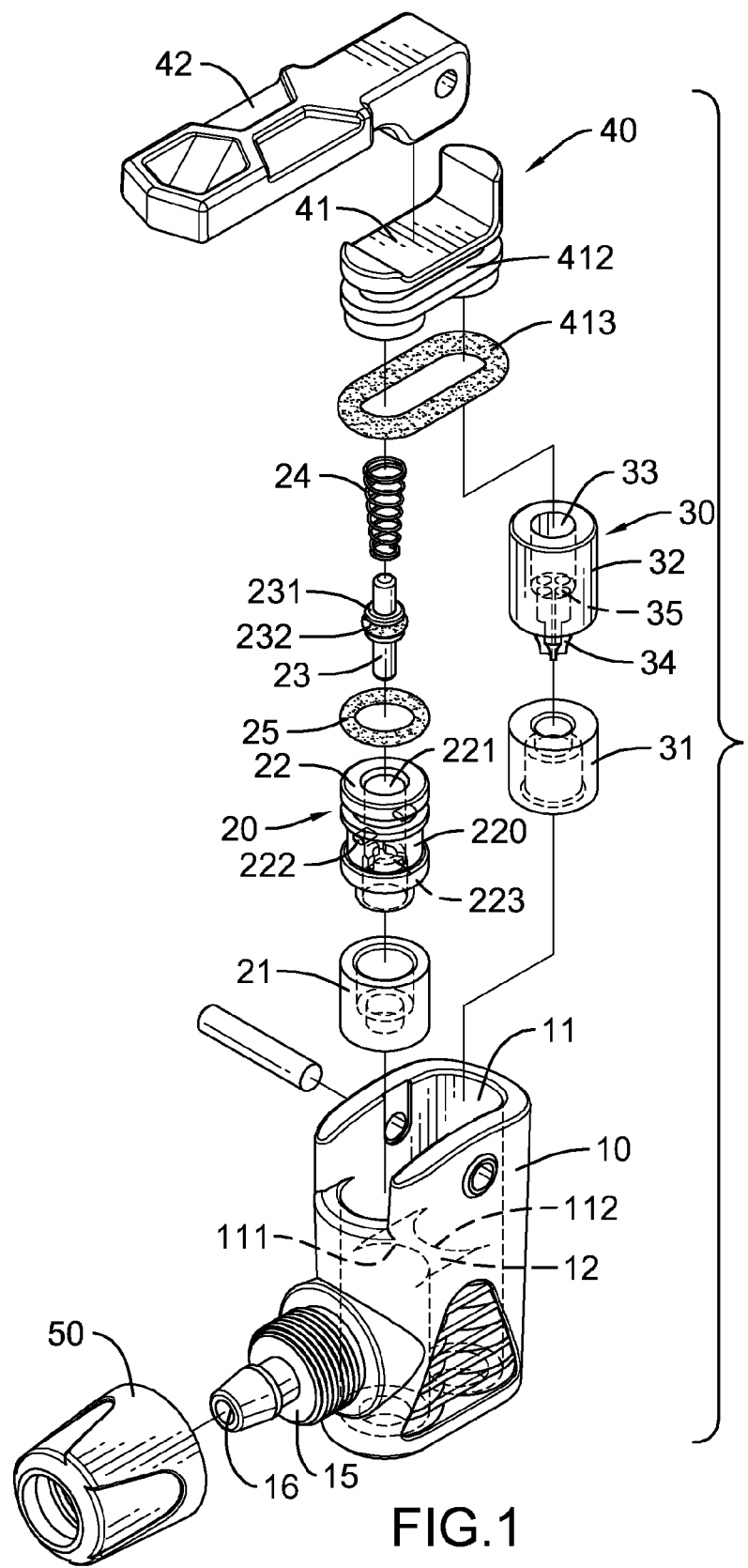
FIG. 1 is an exploded perspective view of an inflating nozzle assembly in accordance with the present invention.
Figure 2:
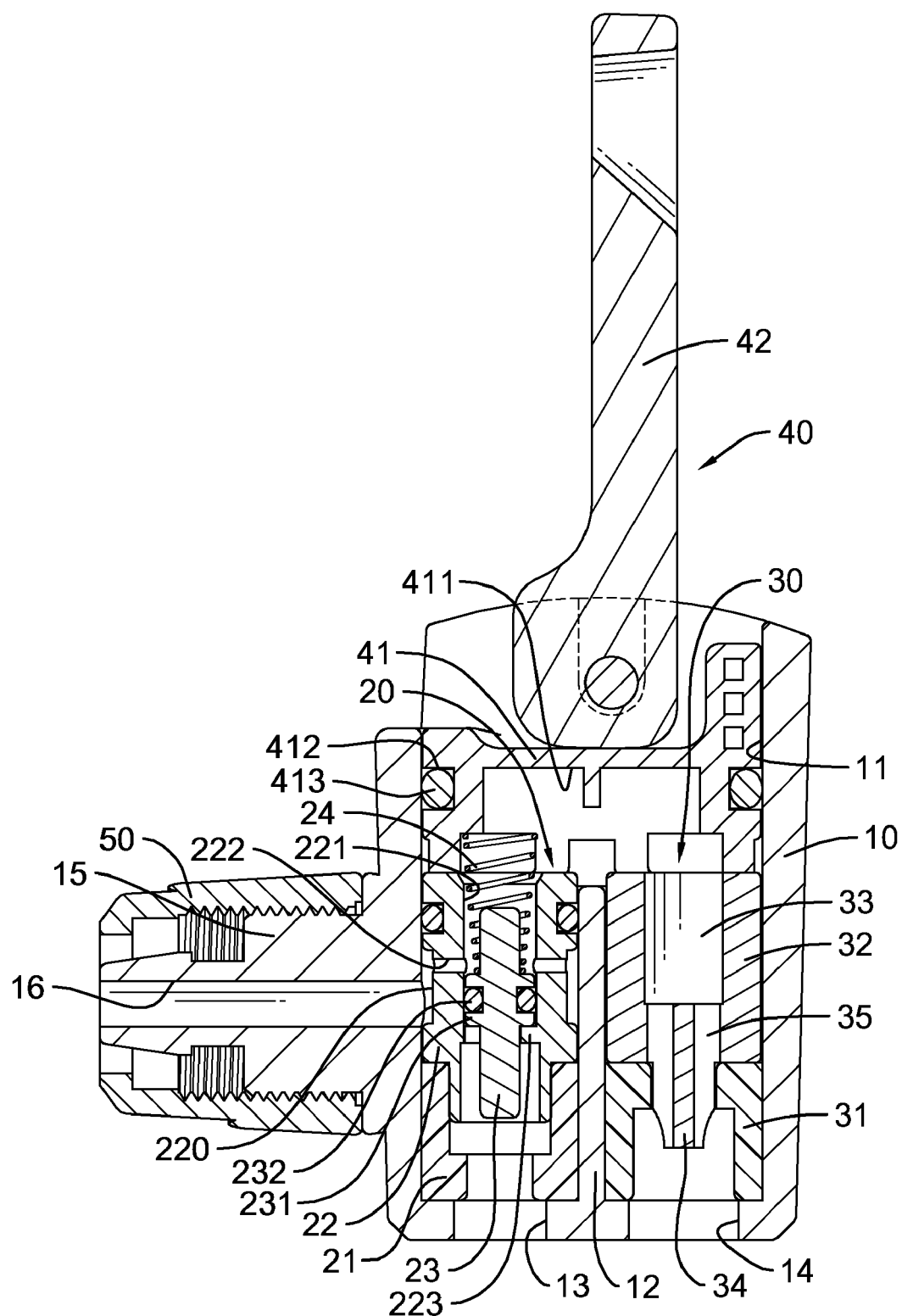
FIG. 2 is a side view in partial section of the inflating nozzle assembly in FIG. 1.

With reference to FIGS. 1 and 2, an inflating nozzle assembly in accordance with the present invention comprises a housing (10), two nozzles (20,30) and a pushing device (40). The housing (10) is hollow and has an outlet end, a pushing end, a baffle (12), a communication space (11), two nozzle chambers (111,112), an inlet (16), a connecting rod (15), a cap (50) and two outlets (13,14). The pushing end is opposite to the outlet end. The baffle (12) is formed in the housing (10) at the outlet end to divide the housing (10) into the two nozzle chambers (111,112) including a first nozzle chamber (111) and a second nozzle chamber (112). The baffle (12) has a length shorter than that of the housing (10) to form the communication space (11) in the pushing end of the housing (10), which communicates with the nozzle chambers (111,112). With the communication space (11), the first nozzle chamber (111) and the second nozzle chamber (112) communicate with each other. The inlet (16) is defined in the housing (10) and communicates with the first nozzle chamber (111). The connecting rod (15) is formed on and protrudes from the housing (10), and the inlet (16) is formed through the connecting rod (15). The connecting rod (15) has an outer thread formed around the connecting rod (15). The connecting rod (15) is adapted to connect to a pressurized air source with a pipe to lead pressurized air into the housing (10) via the inlet (16). The cap (50) is mounted around the connecting rod (15) to hold the pipe connected between the connecting rod (15) and the pressurized air source tightly and has an inner thread screwed with the outer thread on the connecting rod (15). The outlets (13,14) are formed in the outlet end of the housing (10) and include a first outlet (13) and a second outlet (14) communicating respectively with the first and second nozzle chambers (111,112).

The first nozzle (20) is mounting in the first nozzle chamber (111) and comprises a first resilient holder (21), a first nozzle body (22), a nozzle rod (23) and a spring (24). The first resilient holder (21) is mounted in the first nozzle chamber (111) and has a first passage communicating with the first outlet (13). The first nozzle body (22) is connected to the first resilient holder (21), is mounted in the first nozzle chamber (111) and has an axial hole (221), at least one inlet (222), an annular recess (220), an O-ring (25) and a stop (223). The axial hole (221) is defined axially through the first nozzle body (22) and has an inner surface. The at least one inlet (222) is defined radially in the first nozzle body (22) and communicates with the inlet (16) in the housing (10) and the axial hole (221) in the first nozzle body (22). The annular recess (220) is defined around the first nozzle body (22), corresponds to and communicates with the inlet (16) in the housing (10) and has a bottom in which the at least one inlet (222) is defined. The O-ring (25) is mounted around the first nozzle body (22) and abuts with the inner surface of the first nozzle chamber (111). The stop (223) is formed on and protrudes from the inner surface of the axial hole (221).

The nozzle rod (23) is movably mounted in the axial hole (221) in the first nozzle body (22) and has a sealing protrusion (231) and an O-ring (232). The sealing protrusion (231) is annular, is formed around the nozzle rod (23) and abuts with the inner surface of the axial hole (221) to divide the axial hole (221) into two communication segments. The O-ring (232) is mounted around the sealing protrusion (231) and abuts with the inner surface of the axial hole (221) to provide a sealing effect to the communication segments of the axial hole (221) and keep the communication segments from communicating with each other. The communication segments of the axial hole (221) communicate respectively with the communication space (11) and the first outlet (13) in the housing (10).

The spring (24) is connected to the nozzle rod (23) to push the sealing protrusion (231) abutting against the stop (223) and keep one of the communication segments of the axial hole (221) from communicating with the at least one inlet (222) in the first nozzle body (22). In the preferred embodiment, the communication segment that communicates with the first outlet (13) is kept from communicating with the at least one inlet (22) when the sealing protrusion (231) abuts against the stop (223).

The second nozzle (30) is mounted in the second nozzle chamber (112) and has a second resilient holder (31) and a second nozzle body (32). The second resilient holder (31) is mounted in the second nozzle chamber (112) and has a second passage communicating with the second outlet (14). The second nozzle body (32) is connected to the first resilient holder (31), is mounted slidably in the second nozzle chamber (112) and has an end, a through hole (33) and a connecting rod (34). The end of the second nozzle body (32) is connected to the second resilient holder (31). The through hole (33) is defined axially through the second nozzle body (32). The connecting rod (34) is mounted on and protrudes from the end of the second nozzle body (32), extends into the second passage of the second resilient holder (31) and has at least one air channel (35). The at least one air channel (35) is defined in the connecting rod and communicates with the through hole (33) in the second nozzle body (32).

The pushing device (40) is mounted on the pushing end of the housing (10) and comprises a pushing base (41) and a pushing lever (42). The pushing base (41) is mounted slidably in the pushing end of the housing (10), is mounted slidably in the communication space (11) in the housing (10) and has a bottom, a cavity (411), an annular seal recess (412) and a seal (413). The bottom of the pushing base (41) abuts with the first and second nozzles (20,30) and preferably abuts with the first nozzle body (22) and the spring (24) of the first nozzle (20) and the second nozzle body (32) of the second nozzle (30). The cavity (411) is defined in the bottom of the pushing base (41) and communicates with the communication space (11) and the two nozzle chambers (111,112). The annular seal recess (412) is formed around the pushing base (41). The seal (413) is annular, is mounted around the pushing base (41) in the annular seal recess (412) and abuts with the inner surface of the communication space (11) in the housing (10).

The pushing lever (42) is mounted pivotally on the pushing end of the housing (10) and has an end. The end of the pushing lever (42) may be provided with a cam and selectively abuts against the pushing base (41).

Figure 3:
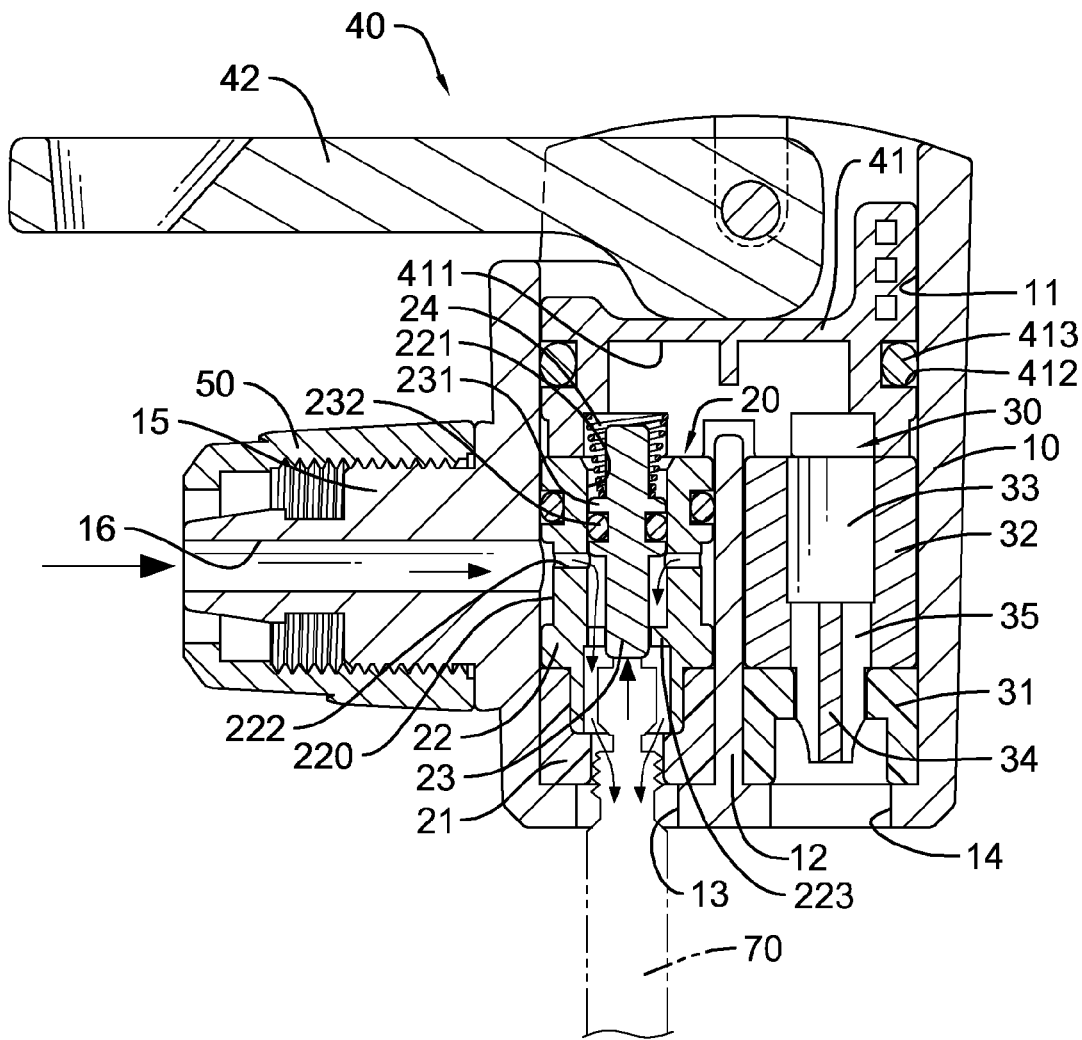
FIG. 3 is an operational side view in partial section of the inflating nozzle assembly in FIG. 1 fitting with one type of air valve.

With further reference to FIG. 3, to connect the inflating nozzle assembly with an air valve (70) fitting with the first nozzle (20), the air valve (70) is inserted into the first outlet (13) and the first passage in the first resilient holder (21) and is connected to the first nozzle (20). The air valve (70) will push the nozzle rod (23) to move relative to the first nozzle body (22) and away from the first outlet (13). The pushing lever (42) is then pivoted relative to the housing (10), and the cam end of the pushing lever (42) will push the pushing base (41) to move into the housing (10). Consequently, the nozzle bodies (22,32) of the nozzles (20,30) will be simultaneously pushed toward the outlets (13,14) to abut against and deform the resilient holders (21,31). With the deformation of the first resilient holder (21), the first resilient holder (21) can securely engage and hold the air valve (70). With the movements of the first nozzle body (22) and the nozzle rod (23) in reverse directions, the sealing protrusion (231) on the nozzle rod (23) will be moved to a position where the communication segment of the axial hole (221) communicating with the first outlet (13) communicates with the inlets (222). Thus, the communication segment of the axial hole (221) that communicates with the communication space (11) in the housing (10) is kept from communicating with the inlets (222).

Accordingly, pressurized air can be led into and inflate an object via the inlet (16) in the housing (10), the inlets (222) in the first nozzle body (22), the communication segment that communicating with the first outlet (13) and the air valve (70). Because another communication segment of the first nozzle body (22) that communicates with the communication space (11) is kept from communicating with the inlets (222), the pressurized air will not enter the second nozzle chamber (112).

Figure 4:
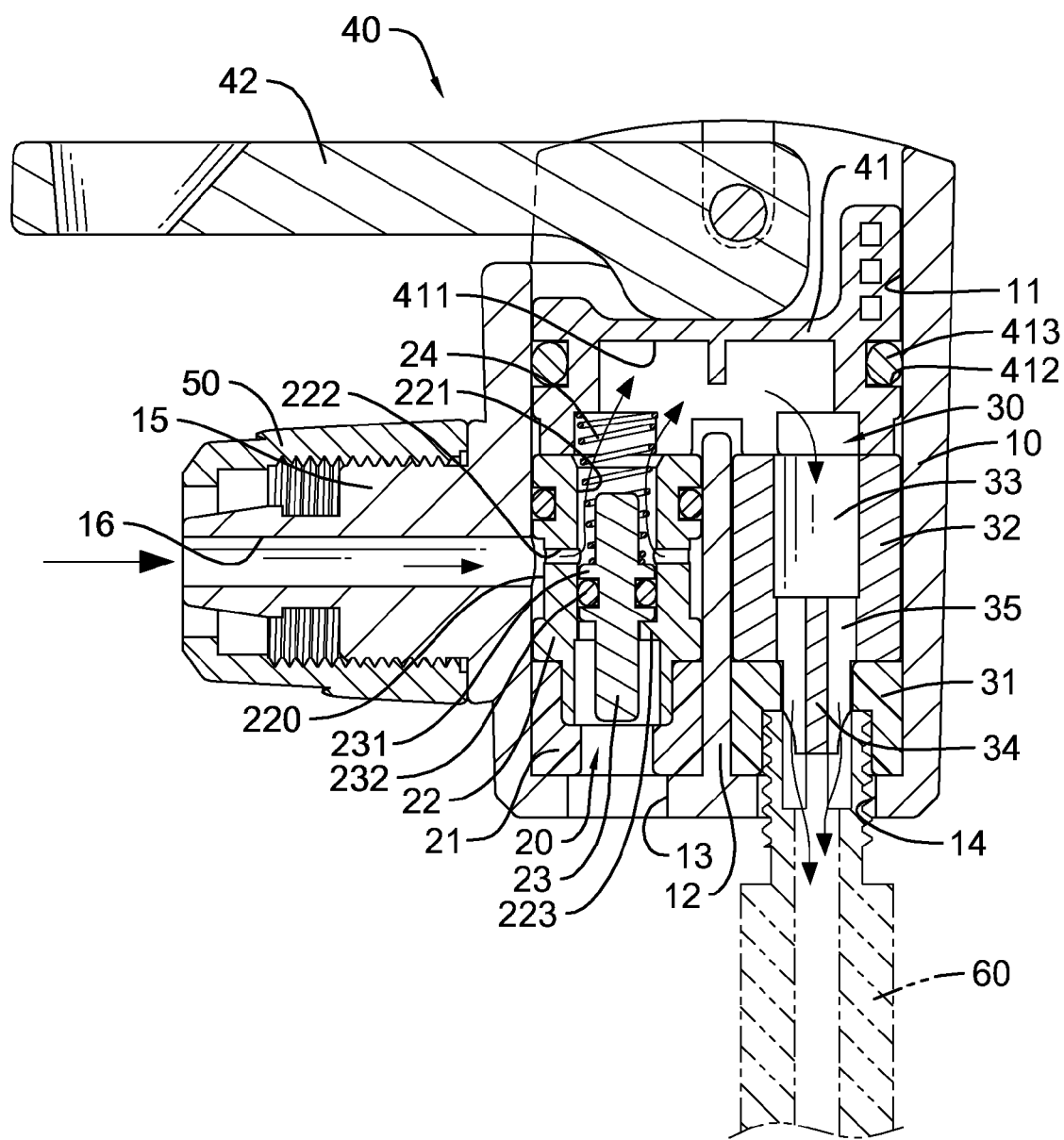
FIG. 4 is an operational side view in partial section of the inflating nozzle assembly in FIG. 1 fitting with another type of air valve.
Figure 5:
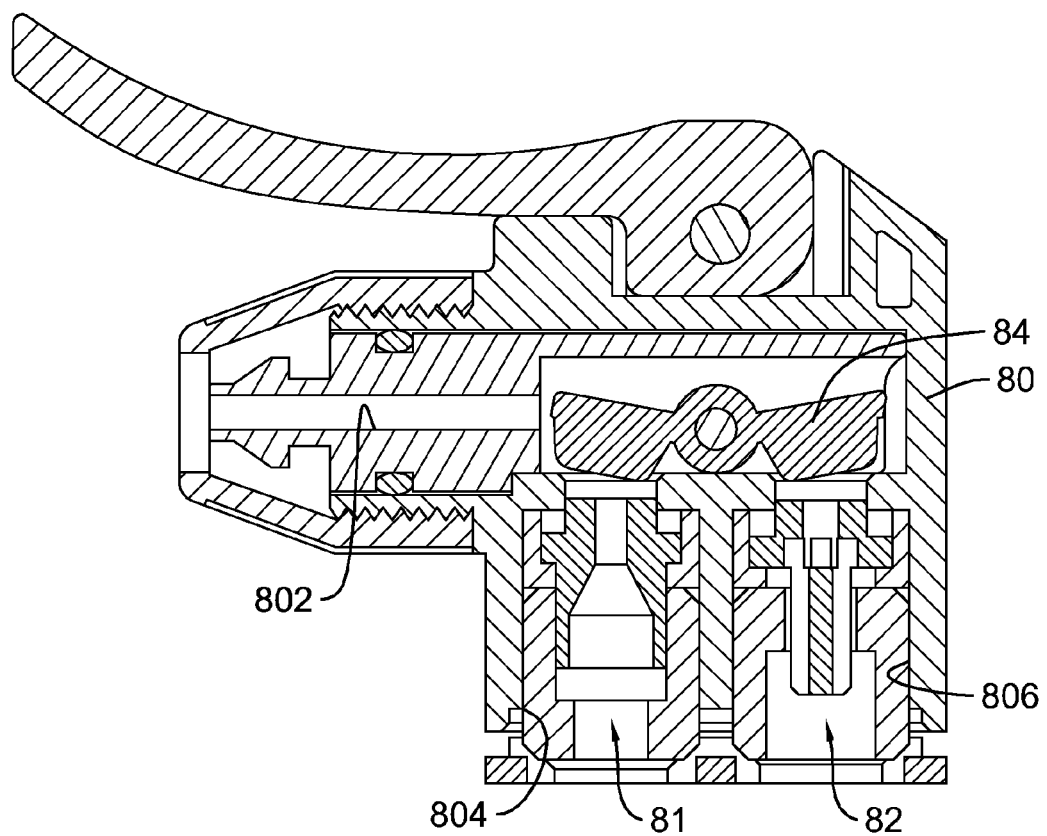
FIG. 5 is a side view in partial section of a conventional nozzle assembly in accordance with the prior art.

With reference to FIG. 4, when another type of air valve (60) fitting with the second nozzle (30) is applied with the nozzle assembly, the air valve (60) is inserted into the second outlet (14) and the second passage of the second resilient holder (31) and is connected to the connecting rod (34) on the second nozzle body (32). The pushing lever (42) is then pivoted to move the pushing base (41) for pushing the nozzle bodies (22,32) to move toward the outlets (13,14). With the deformation of the second resilient holder (31), the air valve (60) inserted into the second outlet (14) is securely held. At this time, although the pushing base (41) moves the first nozzle body (22) toward the first outlet (13), the sealing protrusion (231) on the nozzle rod (23) is still at a position where the communication segment of the axial hole (221) communicating with the first outlet (13) is kept from communicating with inlets (222) in the first nozzle body (22). Thus, the communication segment of the axial hole (221) that communicates with the communication space (11) in the housing (10) communicates with the inlets (222). Accordingly, pressurized air can be led into and inflate an object via the inlets (16,222), the communication segment in the first nozzle body (22) communicating with the communication space (11), the cavity (411) in the pushing base (41), the through hole (33) in the second nozzle body (32), the air channels (35) in the connecting rod (34) and the air valve (60). Because the communication segment of the first nozzle body (221) that communicates with the first outlet (13) is kept from communicating with the inlets (222), the pressurized air will not be discharged from the first outlet (13).

With such an arrangement, the inflating nozzle assembly in accordance with the present invention can fit with different types of air valves (60,70) and is versatile in use. In addition, the spring (24) can provide a force to keep the sealing protrusion (231) on the nozzle rod (23) at a position where the first outlet (13) is kept from communicating with the inlets (222). Accordingly, the airflow led to the outlets (13,14) can be automatically switched by inserting different types of air valves (60,70) into the corresponding outlets (13,14). Therefore, a complicated structure for switching the airflow is unnecessary, the structure of the inflating nozzle assembly can be efficiently simplified. Moreover, the sealing protrusion (231) on the nozzle rod (23) of the first nozzle (20) can provide a leakage-proofing effect with a simple structure, such that the cost for manufacturing the nozzle assembly can be reduced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An inflating nozzle assembly comprising:
    a hollow housing having
        an outlet end;
        a pushing end opposite to the outlet end;
        a first nozzle chamber and a second nozzle chamber formed in the housing and communicating with each other;
        an inlet defined in the housing and communicating with the first nozzle chamber; and
        a first outlet and a second outlet formed in the outlet end of the housing and communicating respectively with the first and second nozzle chambers;
    a first nozzle mounted in the first nozzle chamber and comprising
        a first resilient holder mounted in the first nozzle chamber and having a first passage communicating with the first outlet;
        a first nozzle body connected to the first resilient holder, mounted in the first nozzle chamber and having
            an axial hole defined axially through the first nozzle body and having an inner surface; and
            at least one inlet defined radially in the first nozzle body and communicating with the inlet in the housing and the axial hole in the first nozzle body;
        a nozzle rod movably mounted in the axial hole in the first nozzle body and having a sealing protrusion formed around the nozzle rod and abutting with the inner surface of the axial hole to divide the axial hole into two communication segments; and
        a spring connected to the nozzle rod to keep one of the communication segments of the axial hole from communicating with the at least one inlet in the first nozzle body;
    a second nozzle mounted in the second nozzle chamber and having
        a second resilient holder mounted in the second nozzle chamber and having a second passage communicating with the second outlet;
        a second nozzle body connected to the second resilient holder, mounted slidably in the second nozzle chamber and having
            an end connected to the second resilient holder;
            a through hole defined axially through the second nozzle body; and
            a connecting rod mounted on and protruding from the end of the second nozzle body, extending into the second resilient holder and having at least one air channel defined in the connecting rod and communicating with the through hole in the second nozzle body;
    a pushing device mounted on the pushing end of the housing and comprising
        a pushing base mounted slidably in the pushing end of the housing and abutting with the first and second nozzles; and
        a pushing lever mounted pivotally on the pushing end of the housing and having an end selectively abutting against the pushing base when the pushing lever is pivoted to push the pushing base to move relative to the housing.

2. The inflating nozzle assembly as claimed in claim 1, wherein the housing has a baffle formed in the housing to divide the housing into the two nozzle chambers;
    the baffle has a length shorter than that of the housing to form a communication space in the pushing end of the housing and communicating with the nozzle chambers; and
    the pushing base is mounted slidably in the communication space in the housing.

3. The inflating nozzle assembly as claimed in claim 2, wherein the pushing base has a cavity communicating with the two nozzle chambers.

4. The inflating nozzle assembly as claimed in claim 3, wherein the pushing base has an annular seal mounted around the pushing base and abutting with an inner surface of the communication space in the housing.

5. The inflating nozzle assembly as claimed in claim 4, wherein the nozzle rod further has an O-ring mounted around the sealing protrusion and abutting with the inner surface of the axial hole.

6. The inflating nozzle assembly as claimed in claim 5, wherein the first nozzle body further has an O-ring mounted around the first nozzle body and abutting with an inner surface of the first nozzle chamber.

7. The inflating nozzle assembly as claimed in claim 6, wherein the housing further has a connecting rod formed on and protruding from the housing; and the inlet is formed through the connecting rod.

8. The inflating nozzle assembly as claimed in claim 7, wherein the connecting rod has an outer thread formed around the connecting rod; and a cap is mounted around the connecting rod and has an inner thread screwed with the outer thread on the connecting rod.

9. The inflating nozzle assembly as claimed in claim 8, wherein the first nozzle body further has an annular recess defined around the first nozzle body, corresponding to and communicating with the inlet in the housing and having a bottom in which the at least one inlet of the first nozzle body is defined.

10. The inflating nozzle assembly as claimed in claim 9, wherein the first nozzle body further has a stop formed on and protruding from the inner surface of the axial hole and selectively abutting with the sealing protrusion on the nozzle rod.

11. The inflating nozzle assembly as claimed in claim 1, wherein the pushing base has a cavity communicating with the two nozzle chambers.

12. The inflating nozzle assembly as claimed in claim 1, wherein the pushing base has an annular seal mounted around the pushing base and abutting with an inner surface of the housing.

13. The inflating nozzle assembly as claimed in claim 1, wherein the nozzle rod further has an O-ring mounted around the sealing protrusion and abutting with the inner surface of the axial hole.

14. The inflating nozzle assembly as claimed in claim 1, wherein the first nozzle body further has an O-ring mounted around the first nozzle body and abutting with an inner surface of the first nozzle chamber.

15. The inflating nozzle assembly as claimed in claim 1, wherein the housing further has a connecting rod formed on and protruding from the housing; and the inlet is formed through the connecting rod.

16. The inflating nozzle assembly as claimed in claim 15, wherein the connecting rod has an outer thread formed around the connecting rod; and a cap is mounted around the connecting rod and has an inner thread screwed with the outer thread on the connecting rod.

17. The inflating nozzle assembly as claimed in claim 1, wherein the first nozzle body further has an annular recess defined around the first nozzle body, corresponding to and communicating with the inlet in the housing and having a bottom in which the at least one inlet of the first nozzle body is defined.

18. The inflating nozzle assembly as claimed in claim 1, wherein the first nozzle body further has a stop formed on and protruding from the inner surface of the axial hole and selectively abutting with the sealing protrusion on the nozzle rod.

\* \* \* \* \*